No. 854,202. PATENTED MAY 21, 1907.
E. EFFERT.
GAS STOVE ATTACHMENT.
APPLICATION FILED JUNE 21, 1906.
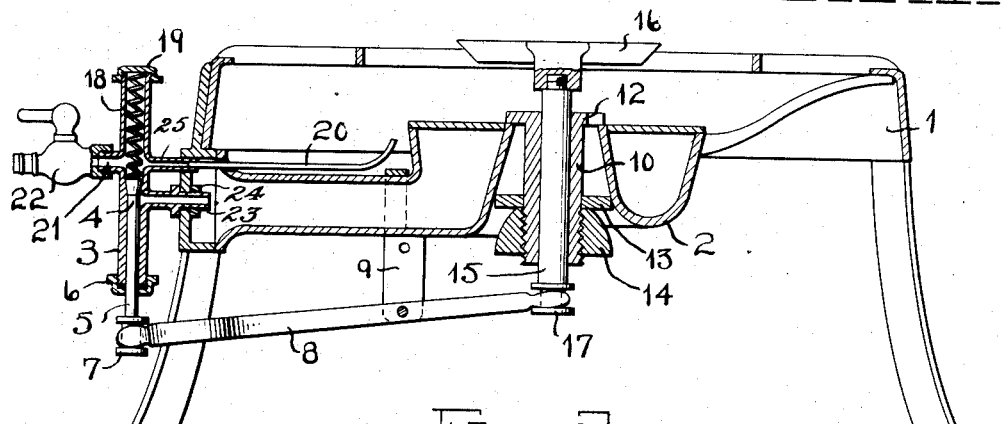
Fig. 1.
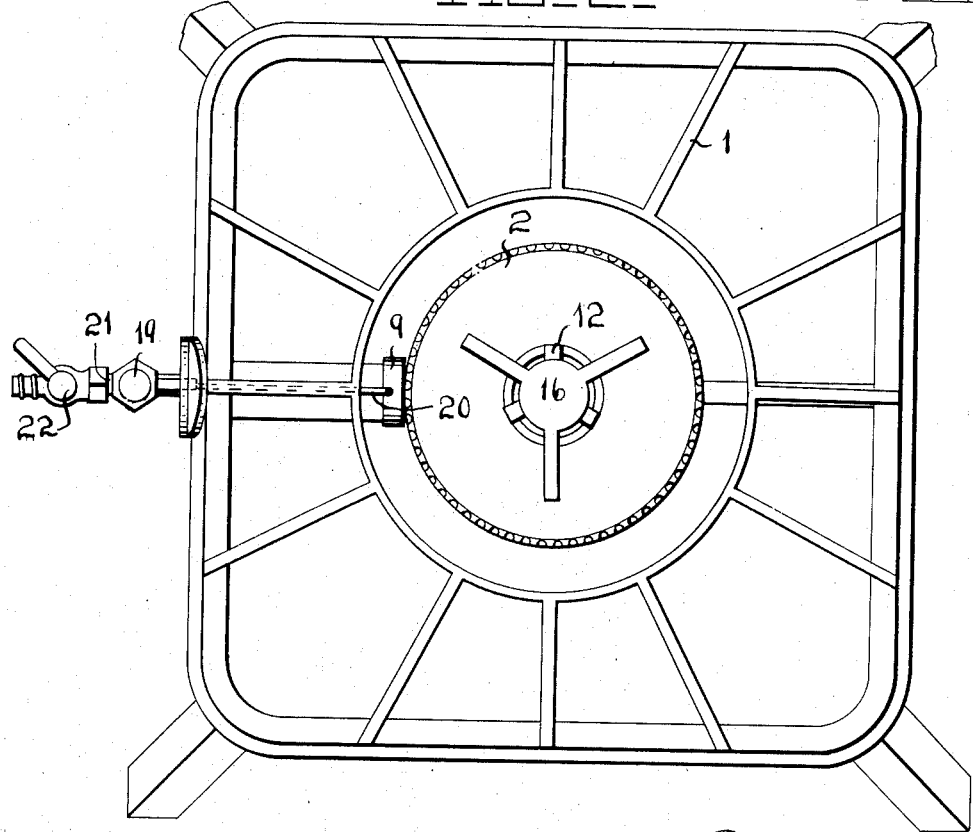
Fig. 2.
Fig. 3.
Witnesses
Inventor
Edward Effert
by H. B. Willson & Co.
Attorneys

UNITED STATES PATENT OFFICE.

EDWARD EFFERT, OF PHILADELPHIA, PENNSYLVANIA.

GAS-STOVE ATTACHMENT.

No. 854,202.

Specification of Letters Patent.

Patented May 21, 1907.

Application filed June 21, 1906. Serial No. 322,786.

*To all whom it may concern:*

Be it known that I, EDWARD EFFERT, a citizen of the United States, residing at Philadelphia, in the county of Philadelphia and State of Pennsylvania, have invented certain new and useful Improvements in Gas-Stove Attachments; and I do declare the following to be a full, clear, and exact description of the invention, such as will enable others skilled in the art to which it appertains to make and use the same.

This invention relates to attachments for gas stoves.

The object of the invention is to provide an attachment whereby the gas will be automatically turned on and lighted upon the placing of a cooking utensil over the burner, and which will be automatically extinguished when the utensil is removed, thereby preventing the wasting and useless burning of the gas.

With the above and other objects in view, the invention consists of certain novel features of construction, combination and arrangement of parts, as will be hereinafter described and claimed.

In the accompanying drawings:—Figure 1 is a vertical, longitudinal section of a portion of a gas stove, showing the application of the invention thereto; Fig. 2 is a top plan view of the same; and Fig. 3 is a detail, perspective view of the automatic valve lever.

Referring more particularly to the drawings, 1 denotes the stove having the usual or any suitable burner 2. Secured to the stove and connected with the burner 2 is a valve casing 3, in which is arranged an automatic controlling valve 4 adapted to be opened and closed by the placing of a cooking utensil over the burner. The valve 4 is provided with a downwardly-projecting stem 5, which is adapted to work through a packed gland 6 on the lower end of the valve casing and is provided on its lower end with a flanged sleeve 7, with which is engaged the bifurcated outer ends of an operating lever 8. The lever 8 is pivotally mounted in a depending bracket 9 secured to the burner, as shown.

In the burner 2 is arranged a guide sleeve 10, on the upper end of which is formed radially-projecting lugs 12, which engage the upper side of the burner, as shown. On the sleeve 10 is arranged a washer plate 13, which is adapted to engage the lower side of the burner. The lower end of the sleeve 10 below the washer is externally threaded, and on said threaded end is adapted to be screwed a winged nut 14, which when screwed up into engagement with the washer plate 13 will securely clamp the same against the under side of the burner which is inclined inward and upwardly and together with the lugs 12 on the upper end of the sleeve will securely hold the latter in place in the center of the burner, as shown.

Slidably mounted in the sleeve 10 is a plunger rod 15, the upper end of which is reduced and threaded. On the reduced threaded upper end of the plunger 15 is screwed a spider 16, with which a cooking utensil is adapted to be engaged when placed over the burner. On the lower end of the plunger rod 15 is formed a pair of annular collars 17, between which is engaged the forked or bifurcated inner end of the operating lever 8, whereby when the plunger is forced downwardly by the weight of the cooking utensil engaging the spider on the upper end thereof, said operating lever will be rocked, thus forcing the outer end of the same, together with the valve stem upwardly, which will raise the valve 4 out of engagement with its seat in the valve casing 3 and permit the flow of gas to the burner.

In the upper portion of the valve casing 3 above the valve 4 is arranged a coil spring 18, the upper end of which bears against a cap 19 which is screwed on the upper end of the casing, as shown. The tension of the spring is normally exerted to force the valve downwardly into engagement with its seat, so that when a cooking utensil is removed from the burner, the valve will be instantly closed, thereby automatically cutting off the supply of gas to the burner. Connected to the valve casing above the valve 4 is a pilot burner 20, to which gas is supplied and kept burning, so that when the gas has been automatically turned on to the main burner by the weight of a cooking utensil placed thereon said burner will be automatically lighted by the light from the pilot burner. To the valve casing 3 above the valve 4 and preferably opposite to the pilot burner is a threaded nipple 21, to which is adapted to be connected a main cutoff valve 22, with which the gas supply pipe is connected and by means of which the gas may be entirely cut off from the main burner and the pilot burner of the stove.

The casing 3 is preferably provided with a laterally extending hollow projection 23 below the valve 4 which forms the inlet to the burner 2 and thereby forms another angle or bend, which with the bend from the nipple 21 makes two bends through which the gas must pass before entering the burner. This will lessen if not prevent the possibility of an explosion when the gas is lighted by throttling the full force of the gas, whereas by locating the pilot light in line with the nipple the full force of the gas is utilized, which will lessen, if not entirely prevent the danger of the pilot going out before the supply of gas is turned off by the valve 22.

The projection 23 is preferably screw threaded and provided with nuts 24 which engages with the wall of the burner 2, and thereby hold it securely in position. The projection 25 for the reception of the pilot 20 also engages with or enters the side of the burner, and prevents the casing 3 from turning on the projection 23 as on a pivot. This forms a cheap and effective means for securing the casing in position, and, with the means for detachably holding the sleeve 10 in position, peculiarly adapts my invention to the ordinary gas stoves with but slight alteration of the latter.

If desired the outer end of the operating lever may be made heavier than its inner end or weighted to aid in the closing of the valve upon the removal of a cooking utensil from the burner, thus providing for the closing of the valve should the spring in any way become defective or fail to operate.

While I have shown and described the sleeve 10 for the plunger rod 15 as being separate from and secured to the burner, it is obvious that in the construction of new stoves this sleeve may be formed integral with the burner.

By providing an attachment such as herein described, the flow of gas to the burner will be immediately stopped upon the removal of a cooking utensil or other article from the burner, thereby providing for the saving of gas, which would otherwise be wasted or uselessly burned unless manually turned off by the main cutoff valve.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. In an attachment for gas stoves, a burner provided with two perforations, a casing provided with a valve seat and with two hollow projections upon one side and one hollow projection on the other side, one of said two projections being screw-threaded and forming a gas inlet, and the other projection on said side being opposite the one projection on said other side and provided with a pilot light, said two projections being adapted to extend through the perforations in the burner, two nuts on the gas inlet upon opposite sides of the wall of the burner, a cap on each end of the casing, one of which is provided with a gland, a valve on said seat with its stem projecting through said cap and gland, a spring on the valve and engaging with the other cap, a lever for engaging with the projecting portion of said stem with one end, and means connected with the other end of the lever for actuating the same when an object is placed on the burner.

2. In an attachment for gas stoves, a burner having an annular inclined wall, a sleeve through the burner having its lower end screw threaded and its upper end provided with a spider which is adapted to rest on the top of the burner, a nut on said lower end, a washer plate on the sleeve above the nut and adapted to engage with the inclined wall, a stem through the sleeve with its upper end adapted to be moved above the top of the stove, a valve for admitting gas to the burner, and means connected with the lower end of the stem for automatically controlling said valve.

In testimony whereof I have hereunto set my hand in presence of two subscribing witnesses.

EDWARD EFFERT.

Witnesses:
 Jos. F. ECKARD,
 ANNA E. WOODS.